Figure 1:
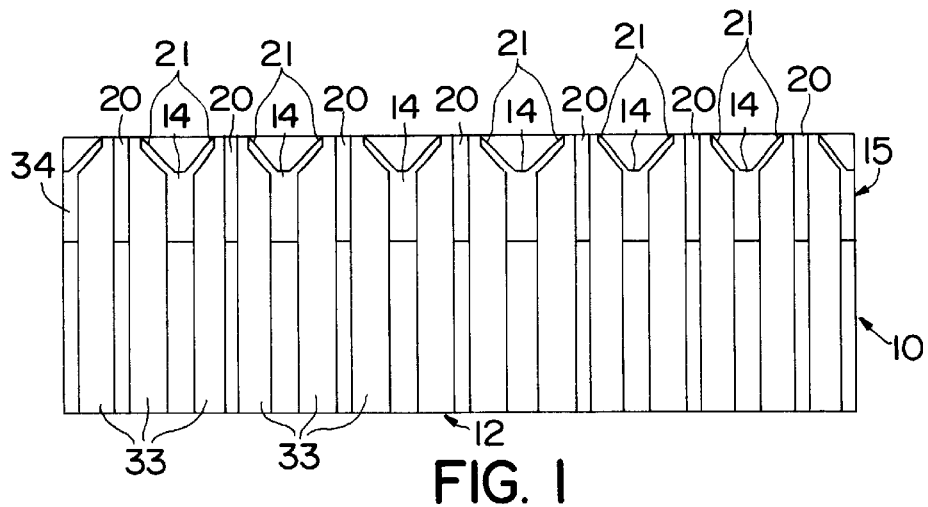

United States Patent [19]

Hoffmann

[11] Patent Number: 5,831,216

[45] Date of Patent: Nov. 3, 1998

[54] PROFILE STRIP OF INSULATING MATERIAL HAVING PRIMARY AND SECONDARY TEETH FOR HOLDING MANY ELECTRICAL CABLES

[75] Inventor: Gerhard Hoffmann, Backnang, Germany

[73] Assignee: Friedrich Lutze Elektro GmbH, Weinstadt, Germany

[21] Appl. No.: 897,367

[22] Filed: Jul. 21, 1997

Related U.S. Application Data

[63] Continuation of Ser. No. 584,917, Jan. 11, 1996, abandoned.

[51] Int. Cl.⁶ ................................................. H02B 1/20
[52] U.S. Cl. ........................... 174/135; 248/69; 248/73; 24/531; 361/826
[58] Field of Search ................................ 174/135, 72 R, 174/72 A, 40 CC, 60; 248/62, 63, 68.1, 69, 73, 74.1; 24/336, 114.5, 531; 312/223.6; D13/154, 155; D8/356, 357; 385/134, 135, 136; 361/826, 827, 828; 379/326, 327, 332; 439/719

[56] References Cited

U.S. PATENT DOCUMENTS 4,163,372  8/1979  Frye et al. ........................... 62/259.1
4,960,253 10/1990  Perrault et al. ....................... 248/68.1
5,035,645  7/1991  Siemon et al. ......................... 439/532
5,463,189 10/1995  Deneke et al. ...................... 174/138 G

FOREIGN PATENT DOCUMENTS 2140801   2/1973  Germany .
2758782   7/1979  Germany ........................... 174/72 A
23 30 166  4/1980  Germany .
4323370   1/1995  Germany ............................. 174/135

Primary Examiner—Bot L. Ledynh
Assistant Examiner—Kamand Cuneo
Attorney, Agent, or Firm—Adams Law Firm, P.A.

[57] ABSTRACT

A profile strip of insulating material is proposed for holding many electrical cables (27)–(30) in switching and control boards and panels, which consists of a mounting section (13) for fastening on a mounting track and a comb-like cable holding section (15) formed thereon. This cable holding section (15) consists of many parallel teeth (14), between which insertion slits (26) for insertion or installation of electrical cables are formed. The insertion slits (26) are limited at the sides by elastic tabs (21) formed on the teeth (14). Between every two teeth (14) a shorter intermediate tooth (20) is positioned such that it divides a portion of the insertion slit (26) into two narrower partial slits. This permits the elastic tabs (21) to hold, in variable fashion, not only cables of smaller diameter (29) in the portion with the intermediate tooth, but also cables of larger diameter (27), (28) in the remaining portion.

8 Claims, 2 Drawing Sheets

PROFILE STRIP OF INSULATING MATERIAL HAVING PRIMARY AND SECONDARY TEETH FOR HOLDING MANY ELECTRICAL CABLES

This application is a 1.62 file-wrapper continuation application of U.S. Ser. No. 08/584,917 filed Jan. 11, 1996 (abandoned).

The invention is a profile strip of insulating material for holding many electrical cables in switching and control boards and cabinets, which consists of a mounting section for fastening on a mounting track and a comb-like cable holding section formed thereon, which consists of many parallel teeth, between which insertion slits for insertion or installation of electrical cables are formed, where the insertion slits are limited at the sides by elastic tabs on the teeth.

This type of profile strip is familiar from, for example, DE-PS 2 330 166. Although the elastic tabs of the typical profile strip deform during insertion of electrical cables, and adapt to the contour of the cables, still only those cables with a diameter between very tight limits can be inserted, since the distance between the teeth limits this diameter. In modern control panels and switch boards, however, cables of very different diameter are often laid, especially because flat cables are often used rolled up into round section shape with a relatively large roll radius. When using larger cable diameters with typical profile strips, therefore, it was necessary to forcibly remove teeth from the cable holding section, or the cables had to be tied to the cable holding section provisionally with a wire. This led not only to a cluttered and unattractive cable layout, but the necessary additional labor (breaking off teeth, provisional bundling, etc.) also led to greater time requirements and therefore to higher assembly costs. A further disadvantage lay in the fact that after breaking out a tooth, only a large diameter cable could be mounted in this area, and no longer a smaller diameter cable.

One purpose of the present invention is, therefore, to so improve the profile strip of the type described in the introduction that electrical cables of widely different diameters can be inserted in a simple fashion at any desired location in the profile strip.

This purpose is fulfilled by this invention in that between every two teeth a shorter intermediate tooth is positioned such that it divides a portion of each insertion slit into two narrower partial slits.

Because of the arrangement proposed in the present invention, it is possible to insert several cables of very small diameter in each slit in the portion with the intermediate tooth and, additionally, at least one cable of considerably larger diameter in the other portion of the slit with no intermediate tooth. The larger cable can have a diameter up to double that of the smaller cables plus the width of the intermediate tooth, so that very large variations are possible. Therefore thin and thick cables can be installed in variable arrangements quickly and securely, and they are held firmly in the cable holding section. The intermediate tooth automatically limits the insertion depth of the cable of larger diameter.

Through the measures described in the dependent claims, advantageous development and improvement of the profile strip listed in claim 1 are possible.

The elastic tabs effectively create enclosed indentations on opposite sides for positioning inserted cables, and prevent them from sliding out of the insertion slit.

In particular, the elastic tabs in the portion of the insertion slit into which the intermediate tooth does not project, each bear at least one semi-circular or jagged indentation for installation of larger cables. If easier changing of the cables is of greater value, then a semi-circular indentation is preferred, and if greater security against sliding out of the insertion slit is desired, then a jagged or barbed indentation can be of greater advantage.

In the portion of the insertion slit with the intermediate tooth, the elastic tabs can also advantageously form several semi-circular or jagged indentations or one long indentation for installation of several smaller cables.

The elastic tabs are effectively formed on the tooth so that they project toward each other diagonally relative to the place of the teeth (14), in order to facilitate elastic deformation of the tabs and adaptation to the shape of the inserted cables.

The mounting section is advantageously formed as a strip with a generally U-shaped profile in order to allow easy insertion on a mounting track, such that, in the assembly configuration, an edge is gripped by the U-shaped profile. At least one of the legs of the U has at least one stop tab or stop notch on the inside, in order to latch onto the mounting section with the appropriate stop tab or stop notch on the mounting track. This ensures a secure grip by the profile strip on the mounting track.

A simple, cost-effective and strong design is accomplished in that the teeth and intermediate teeth of the cable holding section are formed in one piece with the mounting section. The teeth and intermediate teeth of the cable holding section are primarily lamellar in form. The term "lamellar" is used herein to describe the parallel orientation of respective spaced-apart planar surfaces of the teeth and intermediate teeth of the cable holding section.

To improve the cable run in the lowest cable location, the cable holding section has crosswise grooves between each tooth and intermediate tooth, which run crosswise to the length of the cable holding section.

In order to be able to attach cables of even larger diameter to the profile strip, the teeth are advantageously perforated in their free ends to allow threading of a tie-wrap, which is used to bind a larger cable to the free end of the tooth. The elastic tabs form a support at their ends near the free end of the tooth, and are designed as support elements for the cable to be held with a tie-wrap. This allows even larger cables to be attached quickly, easily, and securely to the tie-wrap.

The cable holding section has a tooth of half thickness as a terminal element on both ends, so that profile strips can be arrayed end to end with no variation in the tooth pattern at the junction points. The cables can therefore be inserted in the insertion slits in an unchanged manner, even at the junction points.

Figure 2:
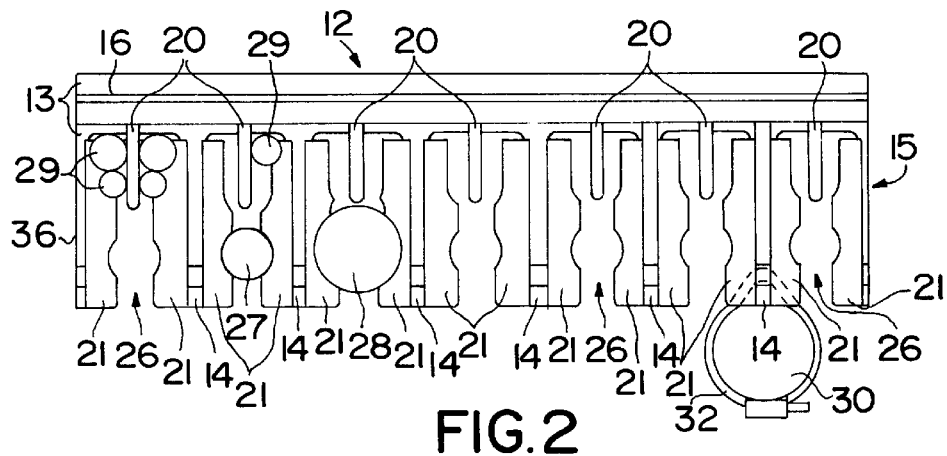
Figure 3:
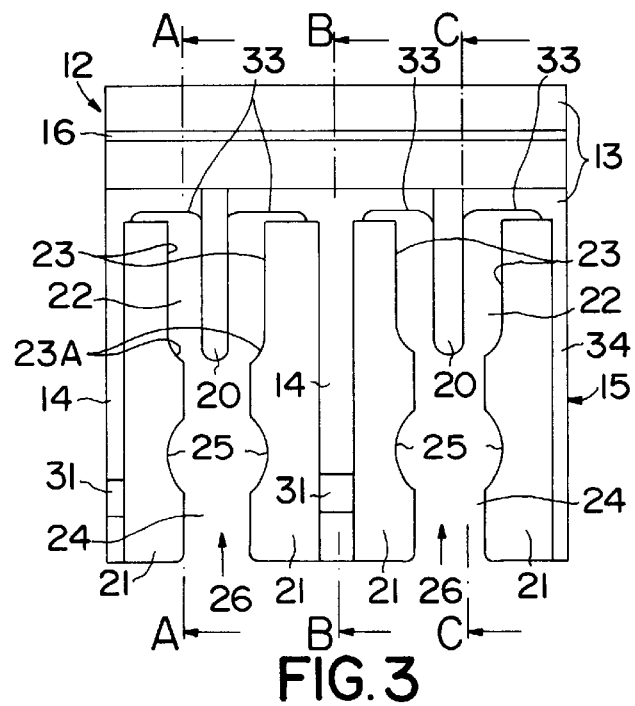
Figure 4:
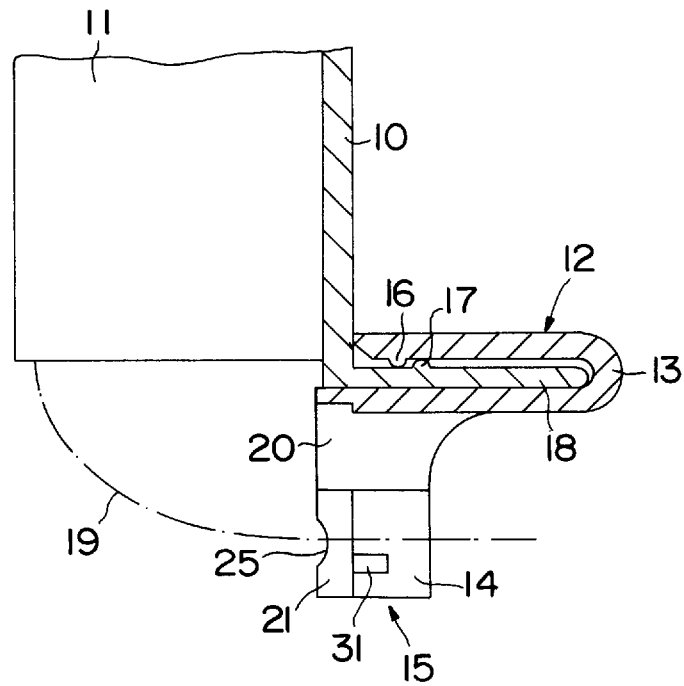
Figure 5:
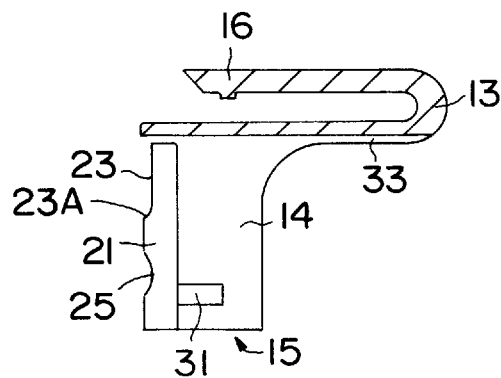

An example of an implementation of the invention is shown in the diagram and explained in more detail in the following description. Shown are:

FIG. 1: an example of an implementation of a profile strip in a view from the bottom, FIG. 2: the same profile strip in a front view with various inserted electrical cables, FIG. 3: an enlarged representation of a portion of the profile strip in FIG. 2, FIG. 4: a sectional view of the profile strip at the section line C—C in FIG. 3, with a representation of a portion of a mounting track, FIG. 5: a sectional view of the profile strip at the section line A—A in FIG. 3

Figure 6:
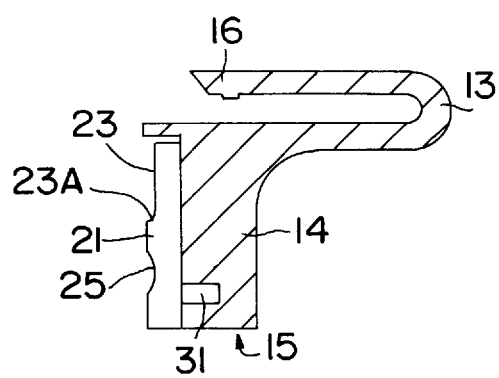

FIG. 6: a sectional view of the profile strip at the section line B—B in FIG. 3.

In the state of the art given in the introduction, mounting tracks (10) are generally mounted horizontally in control panels and boards, so that the appropriate required switching elements (11), such as relays, timers, suppressor modules, power supplies, interface modules, and the like can be arranged in rows on the mounting tracks. These mounting tracks (10) are, for example, made out of U-profile tracks and have profile elements for simplified mounting of switching elements. One such mounting track (10) with a switching element (11) is also shown schematically in FIG. 4, in both a section and side view. In general, many cables are fed into the switching elements (11) from above and from below. These cables are fastened in profile strips (12), as they are shown in FIG. 1 through 6, for orderly cable arrangement and prevention of undesired bending and movement.

As can be seen especially in FIGS. 4 to 6, the profile strips (12) consist mainly of a strip-like mounting section (13) with a primarily U-shaped profile, on which many parallel, lamellar comb-like teeth (14) are formed, which form a cable holding section (15).

The strip-like mounting section (13) has, on the inside of the U-leg, a stop tab (16), which engages an appropriately formed stop tab (17) on a mounting flange (18) of the mounting track (10). To mount the profile strip on the mounting track, it must simply be pressed onto the mounting flange (18) until the opposing stop tabs (16), (17) engage each other. The mounting track (10) has on its upper end an appropriate mounting flange (18), so that a profile strip (12) of this type with its mounting section (13) can also be attached and fixed above the switching elements (11). The electrical cables leading from the underside of the switching elements (11) and held in the profile strip (12) are represented schematically in FIG. 4 by the dashed line (19). Between the lamellar teeth (14), which are arranged in a comb-shaped grid, shorter intermediate teeth (20) are formed centrally on the mounting section (13). These intermediate teeth (20) are approximately half as long as the teeth (14) and similarly lamellar in form. As shown in FIG. 1, on the end of each of the teeth (14), which run parallel to the mounting surface of the mounting track (10), two thin, elastic tabs (21) are formed. On each tooth, two tabs (21) protrude outward diagonally from this end edge of the teeth.

As can be seen especially clearly in FIG. 3, in the area of the intermediate teeth—that is, in an inner holding section (22)—the tabs (21) create long indentations, which largely extend over the length of the intermediate teeth (20). In the area opposite the end section of the intermediate teeth (20), these indentations are each rounded off as indicated at reference numeral 23A. In the other outer holding section (24)—that is, in the area between two tabs into which the intermediate tooth does not extend—the tabs (21) form semicircular indentations on opposite sides.

The space between two tabs (21) serves as an insertion slit (26) for electrical cables. In the outer holding section (24), this insertion slit allows insertion of electrical cables (27), (28) of larger diameter, where the indentation (25) surrounds and therefore holds the appropriate cable (27), (28). Depending on the diameter of the electrical cables (27), (28) the neighboring tabs (21) are deformed more or less and adapt to the outer contour of the cable. The insertion depth for such cables as (27), (28) of larger diameter is limited by the intermediate tooth (20).

Electrical cables of smaller diameter (29) can be pushed past the intermediate tooth and then wedge between an intermediate tooth and a tab (21). As can be seen in FIG. 2, two cables (29) of smaller diameter can be inserted on each side of an intermediate tooth (20). The long indentations (23) serve to improve the fixation of these cables (29).

In a modification of the application form shown, the lengths of the teeth (14) and the intermediate teeth (20) can, of course, vary, so that a greater or lesser number of smaller cables (29) or larger cables (27), (28) can be contained between two teeth. The shape of the indentations (23), (25) can also vary. Instead of rounded shapes, jagged or square-cornered contours can appear, which provide a type of grip for the cables (27)–(29). Additionally, instead of long indentations (23) in the interior holding section (22), individual indentations for one cable each can be used.

In order to be able to attach cables (30) of even larger diameter to the profile strip (12)—that is, cables whose diameter is greater than the distance between two teeth (14)—the teeth (14) at the outer end of the outer holding section have, in addition to the tabs (21), perforations (31) which allow attachment of a tie-wrap (32).

An electrical cable of this type (30) is laid at the outer edge of a tooth (14) and then attached to the tooth using a tie-wrap (32) threaded through the perforation (31). This cable (30) rests on the outer ends of the tabs (21), which are strengthened for this purpose, for example, and therefore allow secure attachment of the cable (30).

As can be seen in FIGS. 1, 2, 3, and 5, parallel grooves run between each tooth (14) and intermediate tooth (20), crosswise to the length of the profile strip (12) in the mounting section (13). The lowest inserted cables run in this grooves (33).

A tooth (34) is located on each end of the profile strip (12) instead of a tooth (14), where this tooth (34) is an end tooth and is only half as thick as a tooth (14). If two profile strips are arrayed end to end lengthwise, then two such teeth (34) form a tooth (14), and the grid size of the teeth (14) proceeds continuously across the entire installation.

In a modification of the application example shown, instead of a snap-mountable mounting section (13), another type of mounting section may be used, which is connected to a mounting track (10) or similar structure in another fashion—for example, with screws, quick-latch connectors, pins, etc.

The edges of the tabs (21) that border the insertion slit (26) are, for example, made elastic but hard enough that they lightly penetrate the insulating coating of the cables to be held and thereby fix them.

I claim:

1. A profile strip of electrically-insulated material, adapted for holding relatively large and relatively small diameter electrical cables in switching and control boards and panels, comprising:

(a) a mounting section for fastening on a mounting track;

(b) a cable holding section carried on the mounting section and including a plurality of parallel spaced-apart primary teeth extending generally perpendicular to a mounting surface of the mounting section, wherein the space between two adjacent ones of said primary teeth defines an insertion slit adapted for receiving the electrical cables therein;

(c) a pair of resilient tabs formed with each of the primary teeth and extending at an angle relative to the primary teeth, wherein said two adjacent tabs of adjacent ones of said primary teeth cooperate to retain the electrical cables within the insertion slit formed between the two adjacent ones of said primary teeth; and (d) a plurality of intermediate secondary teeth extending from the mounting section and having a length less than that of the primary teeth, wherein a single intermediate one of said secondary teeth is positioned between said two adjacent ones of said primary teeth in the insertion slit to divide the insertion slit into two narrower partial slits adapted for receiving the relatively small diameter cables therein and forming a space above the partial slits for receiving the relatively large diameter cables therein, and wherein each one of said pair of resilient tabs defines a channel extending generally from a top of said intermediate one of said secondary teeth to a bottom of said intermediate one of said secondary teeth to engage and retain the smaller diameter cables in the narrower partial slits.

2. A profile strip according to claim 1, wherein the pair of resilient tabs formed with each of the primary teeth extend diagonally outwardly relative to the primary teeth.

3. A profile strip according to claim 1, wherein the mounting section has a generally U-shaped profile including first and second legs.

4. A profile strip according to claim 3, wherein at least one of the legs of the mounting section has at least one stop notch on an inner side thereof.

5. A profile strip according to claim 1, wherein the primary teeth and the secondary teeth in the cable holding section are integrally formed in one piece with the mounting section.

6. A profile strip according to claim 1, wherein the mounting section includes crosswise grooves extending respectively between adjacent ones of the primary teeth and secondary teeth and which run crosswise to the length of the mounting section.

7. A profile strip according to claim 1, wherein at least one of the primary teeth includes a perforation in a free end thereof and further wherein a tie-wrap is threaded through said perforation for being used to attach one or more of the electrical cables to the free end of the at least one of the primary teeth.

8. A profile strip according to claim 1, wherein the cable holding section has first and second terminal end elements comprising end teeth on each end of the cable holding section, said end teeth being half as thick as the primary teeth, and having only one tab protruding toward an adjacent one of the primary teeth.

* * * * *